US00RE33943E

United States Patent [19]

Arzberger et al.

[11] E Patent Number: Re. 33,943

[45] Reissued Date of Patent: Jun. 2, 1992

[54] POST MIX FRUIT JUICE DISPENSER

[75] Inventors: William A. Arzberger, Medfield, Mass.; Michael J. Riley, Alpharetta, Ga.; William H. DeCastro, Jr., Sangerville, Me.; Edward J. LaLumiered, deceased late of, Woburn, Mass., by Marie E. LaLumiere, Woburn, Mass., legal representative

[73] Assignee: Jet Spray Corp., Norwood, Mass.

[21] Appl. No.: 104,436

[22] Filed: Oct. 5, 1987 (Under 37 CFR 1.47)

Related U.S. Patent Documents

Reissue of:

[64] Patent No.: 4,610,145
Issued: Sep. 9, 1986
Appl. No.: 653,497
Filed: Sep. 21, 1984

[51] Int. Cl.[5] ..... F25B 49/00

[52] U.S. Cl. ..... 62/127; 62/303; 62/390; 62/419; 222/129.1; 222/146.1

[58] Field of Search ..... 62/391, 390, 298, 303, 62/419, 139, 127; 222/148, 146.1, 129.1

[56] References Cited

U.S. PATENT DOCUMENTS

| | | | |
|---|---|---|---|
| 2,167,547 | 7/1939 | Holderle et al. | 222/129.1 |
| 2,381,013 | 8/1945 | Tanner | 62/390 X |
| 2,721,450 | 10/1955 | Entler | 62/304 X |
| 2,934,243 | 4/1960 | Metzger | 62/390 X |
| 3,237,810 | 4/1954 | Gran | 222/131 |
| 3,285,474 | 11/1966 | Gran | 62/390 X |
| 3,892,335 | 7/1975 | Schroeder | 222/129.1 |
| 3,898,861 | 8/1975 | McMillin | 62/177 |
| 4,182,363 | 1/1980 | Fuller | 137/392 |
| 4,212,414 | 7/1980 | Beyens | 222/148 |
| 4,248,061 | 2/1981 | Rousseau et al. | 62/419 |
| 4,316,557 | 2/1982 | Benoun et al. | 222/129.1 |
| 4,493,441 | 1/1985 | Sedam et al. | 222/129.1 |
| 4,497,343 | 2/1985 | Brown et al. | 222/129.1 |

FOREIGN PATENT DOCUMENTS

| | | |
|---|---|---|
| 5513999 | 4/1975 | Japan . |
| 5187496 | 7/1979 | Japan . |
| 571199 | 6/1980 | Japan . |
| 56-95897 | 12/1980 | Japan . |
| 2065603 | 11/1980 | United Kingdom . |

*Primary Examiner*—William E. Wayner
*Attorney, Agent, or Firm*—Wolf, Greenfield & Sacks

[57] ABSTRACT

A post mix fruit juice dispenser having a refrigerated cabinet at the top which houses separate containers for different juice concentrates. The machine mixes potable water with the concentrate on demand. The potable water is cooled in an ice bath at the rear of the cabinet, and the same refrigeration system which cools the ice bath provides a source for cooling air circulated in the cabinet about the concentrate containers. The concentrate containers and their discharge assemblies may be removed from the machine for cleaning, but the containers may be replenished through filling assemblies at the top of the cabinet without removing them.

57 Claims, 9 Drawing Sheets

110
40
46
20
32
48
34
74
36
6
28
76
76
192
194
40
254
240
30
254
240
382
238
362
238
362
24
26
360
360
6
25
22
22

150
3
160
152
138
136
45
124
38
ICE
162
162
156
126
132
124
130
124
134
146
124
182
180
182
50
183
58
184
186
60
62
4
184
184
46
189
48
114
116
71
77
112
96
110
32
79
79
34
5
106
107
4
5
81
74
30
74
3

7
7
ICE
124
45
160
126
38
152
162
150
154
130
156
120
122
124
36
180
184
50
116
108
186
182
183
184
58
72
60
184
62
66
68
67
44
92
88
184
102
100
98
54
184
189
64
73
70
71
57
56
198
202
226
222
228
107
106
86
90
96
184
82
184
73
55
76
80
52
110
42
40
30
34
74
184
262
206
298
294
264
266
302
212
26
232
236
234
240
238

76
34
274
260
259
206
262
276
272
294
264
280
30
286
266
268
302
31
300
306
301
326
310
314
312
316
212
324
314
326
320
322
6B
254
246
234
236
252
240
238
6B
6C
6C
242
214
232
244
222
224
363
362
230
360
228
226
248
202
318
328
304
308
80
78
271
82
298
270
290
292
70
71
73
228
282
284
50
44

254
252
260
236
242
234
258

POST MIX FRUIT JUICE DISPENSER

Matter enclosed in heavy brackets [ ] appears in the original patent but forms no part of this reissue specification; matter printed in italics indicates the additions made by reissue.

INTRODUCTION

This invention relates to beverage dispensers and more particularly comprises a post mix fruit juice dispenser capable of simultaneously dispensing two different beverages.

In accordance with the present invention juice concentrate is stored and dispensed from a cabinet in the upper part of the machine. The machine is capable of maintaining the concentrate at 40° F. and provides individual removable containers for separate concentrates. Access ports on the top of the machine enable concentrate to be replenished without removing the containers from the cabinet.

The same refrigeration system is used to maintain the temperature of the concentrate at the reduced level and to chill the potable water mixed with the concentrate on demand for a beverage. When the concentrate falls below a certain level, sensors disable the beverage discharge assembly for that particular beverage.

The dispenser is designed to offer two separate beverages, and the concentrate containers are of different volumes so that an increased capacity is provided for the more popular flavor.

The cabinet in which the concentrate containers are stored is well insulated but is provided with convenient front access by means of a hinged door so that the containers may be removed for cleaning or replacement. Separate filling assemblies are provided in the cabinet so that each of the concentrate containers may be replenished without opening the door. The concentrate containers along with their discharge assemblies can conveniently be removed from the machine and the various parts may be easily disassembled for cleaning.

A refrigeration system is provided which includes an ice bath in the upper portion of the machine behind the cabinet liner which houses the concentrate containers. The ice bath contains potable water coils for effectively chilling the potable water, and the refrigeration system which cools the bath also provides an air cooling system in the cabinet through which air in the cabinet can be circulated so as to maintain the concentrates at a reduced temperature. The ice bath allows a large number of drinks to be drawn from the machine over a short period of time with little or no increase of the potable water temperature.

The various features of the dispenser referred to above cooperate to provide a dispenser capable of supplying freshly reconstituted natural fruit juices which are most healthful and tasty.

The invention will be more fully appreciated from the following description read in connection with the accompanying drawings.

BRIEF FIGURE DESCRIPTION

DETAILED DESCRIPTION OF THE DRAWINGS

Figure 1:
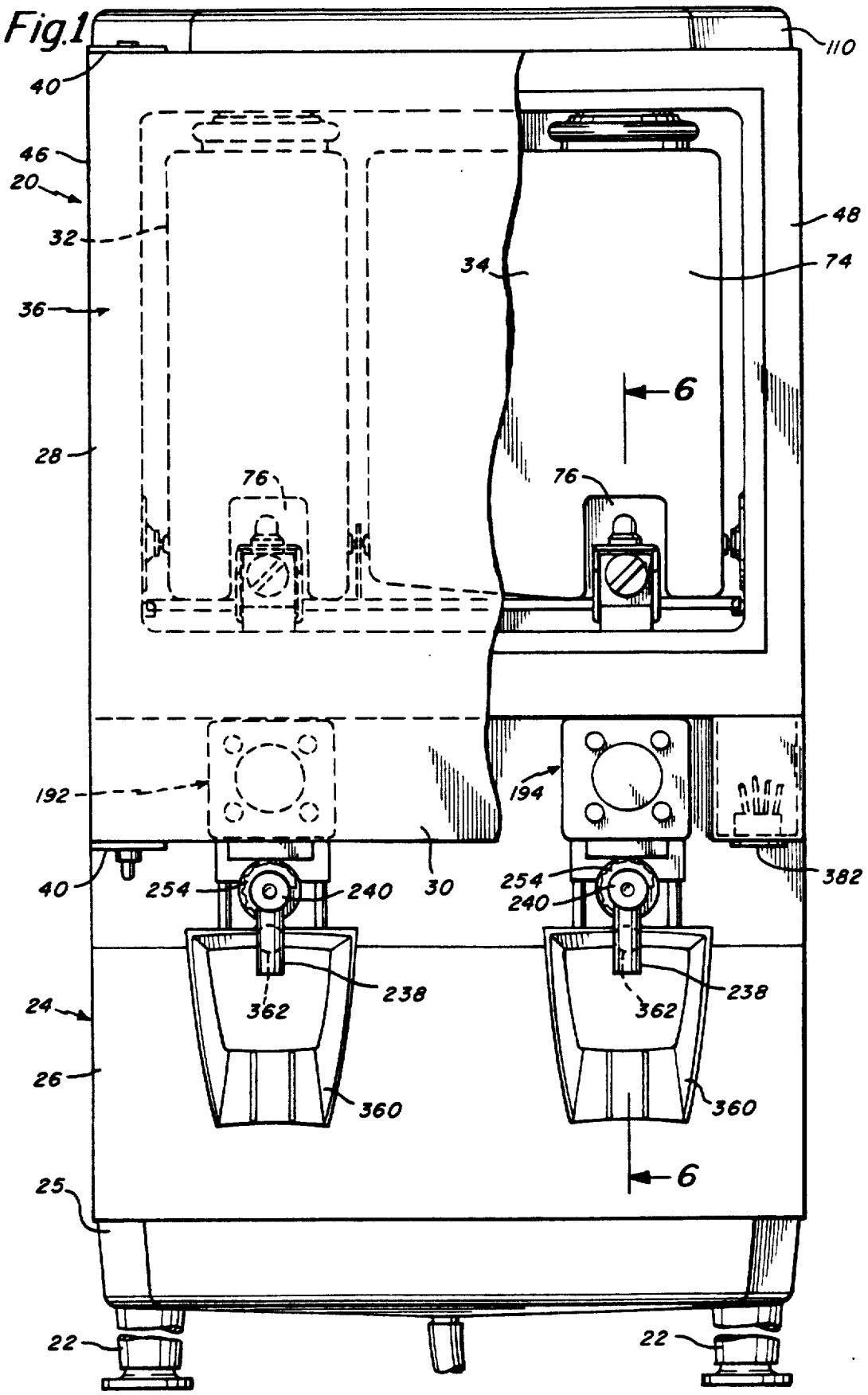
FIG. 1 is a front elevation view, with parts broken away, of a beverage dispenser constructed in accordance with this invention.
Figure 1A:
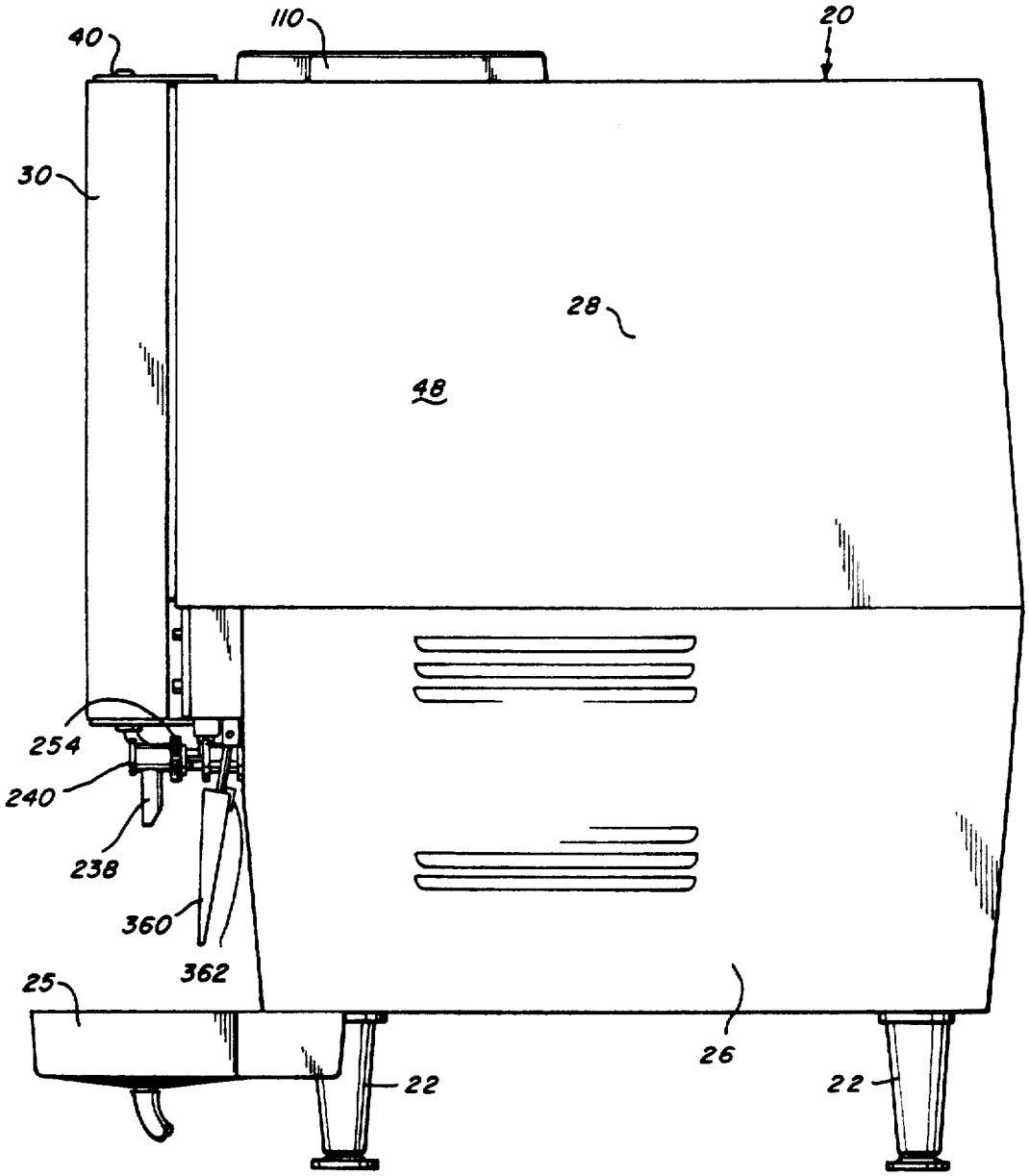
FIG. 1A is a side elevation view of the beverage dispenser shown in FIG. 1.

The beverage dispenser of this invention is a post mix machine which combines beverage concentrate and cold water and discharges the mixture on demand. Typically, the machine is used as a fruit juice dispenser and in its preferred form is capable of dispensing metered quantities of two separate fruit juices, for example orange juice and grapefruit juice.

To provide the most healthful and tasty drink, the unit dispenses freshly reconstituted natural fruit juice. The best results are obtained by using juice concentrate which is frozen in the processing plant and held in the frozen state until a day or so before use, at which time it is removed from the freezer and placed in a refrigerator where it is allowed to thaw and warm to approximately 40° F. The concentrate at that temperature is introduced to the concentrate reservoir in the dispenser.

The beverage dispenser shown in the drawing is intended to be placed on a countertop or table, and its overall dimensions are approximately 27" high 14" wide, and 23" deep. The dispenser includes a housing 20 supported by four legs 22 attached to the base 24 of the housing adjacent its four corners. Base 24 also carries a drip tray 25. The housing 20 has a lower portion 26 which contains a substantial part of the dispenser refrigeration system including the compressor and condenser, as well as the dispenser controls and part of the potable water system. The upper portion 28 of the dispenser has an insulated cabinet 36 closed at its front by hinged door 30 and which contains at the front the two concentrate containers 32 and 34. The door 30 is held closed by magnetic latch 31. The containers 32 and 34 are mounted in the insulated cabinet 36 in front of an ice bath 38 located at the rear of the upper portion of the machine.

The various parts of the dispenser are described in detail below under appropriate headings.

INSULATED CABINET

Figure 2:
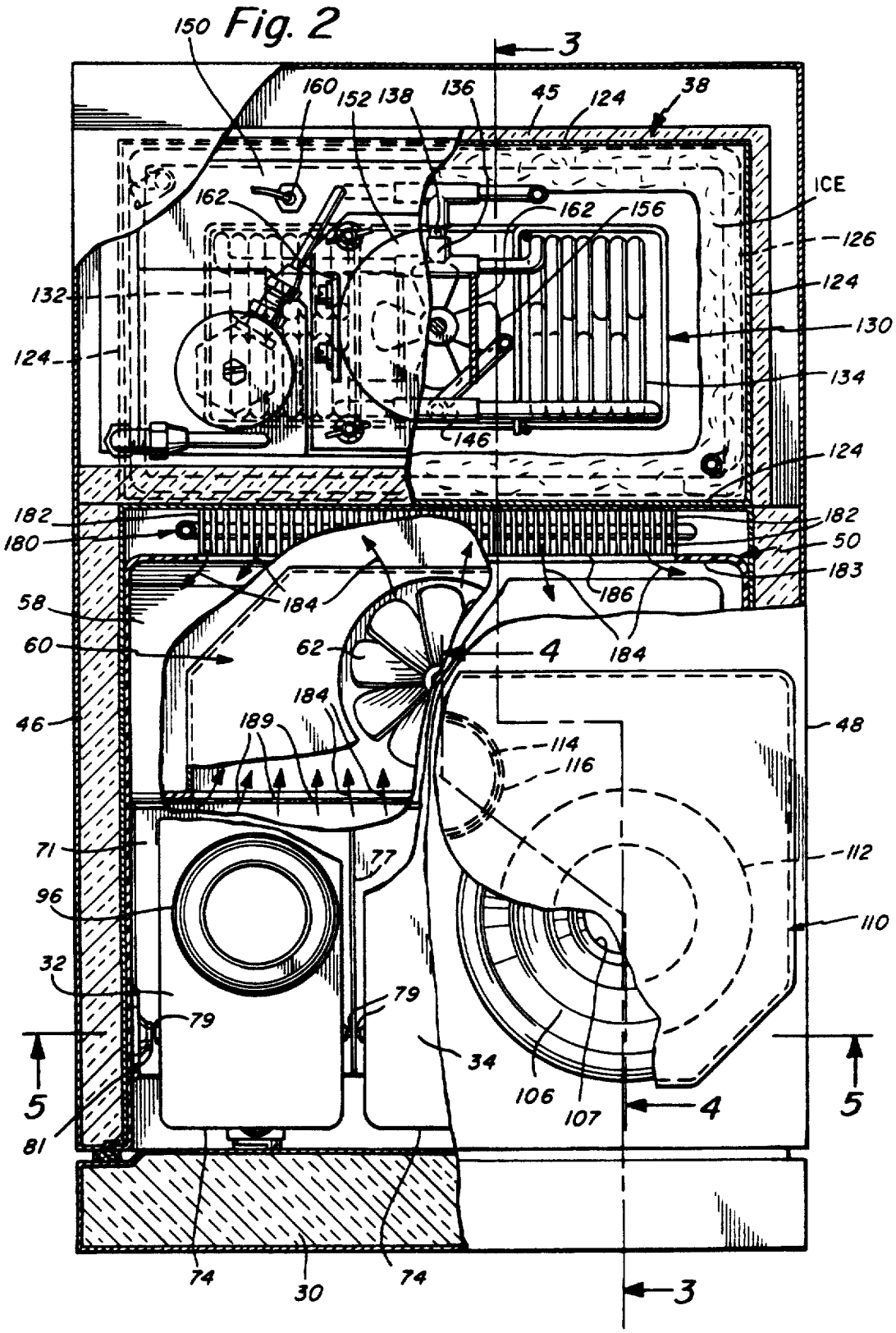
FIG. 2 is a top plan view, with parts broken away, of the beverage dispenser shown in FIG. 1.
Figure 3:
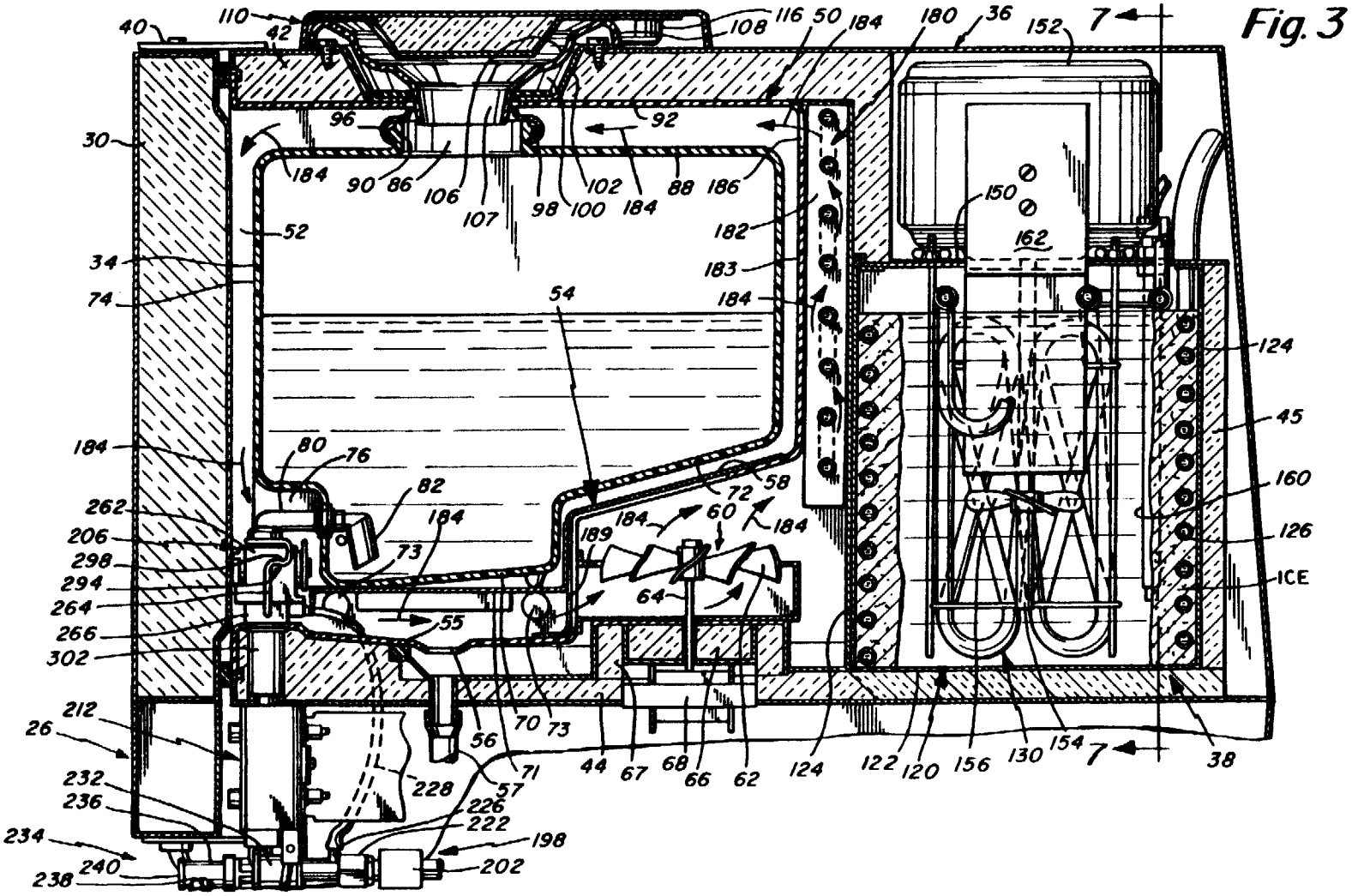
FIG. 3 is a fragmentary cross-sectional view of the upper portion of the beverage dispenser, taken along the section line 3—3 in FIG. 2.

The cabinet 36 is accessible through the hinged door 30 carried by the hinges 40 and is insulated at the top by top wall 42, at the bottom by bottom wall 44, at the front by the insulation in door 30, at the back by rear wall 45 and on the sides by side walls 46 and 48. The cabinet contains a liner 50 which is open at the front 52 and which receives the two concentrate containers 32 and 34. The bottom wall 54 of the cabinet has a lower front section 55 with a drain hole 56 in its center and an elevated rear portion 58 that slants downwardly toward the lower front section 55 of the bottom wall 54. The drain hole 56 is aligned with the drain tube 57 that may be connected to the drip tray 25. The elevated rear portion 58 of the bottom wall of the liner provides room in the cabinet for the fan assembly 60. In FIG. 3 the assembly 60 is shown to include a fan 62 supported for rotation on its vertical shaft 64 which extends through the insulation 66 in the raised section 67 of bottom wall 44 of the cabinet. As shown in FIG. 2, the fan assembly is centered in the cabinet between the side walls 46 and 48. The shaft 64 is driven by a motor 68 mounted in the recess in the lower surface of the bottom wall 44 defined by the raised section 67. The fan 62 circulates the air in the cabinet to assist in maintaining the concentrates in the containers 32 and 34 at a reduced temperature, preferably 40° F. The cooling system is described in greater detail below.

CONCENTRATE CONTAINERS

The concentrate containers 32 and 34 as shown in FIGS. 1 and 2, are not of the same size. Rather, container 34 has a substantially larger capacity than the container 32 and is therefore used for the more popular beverage. In the preferred form the larger container is designed to hold 8.5 liters while the smaller container 32 will hold 3.7 liters. The larger container 34 holds three 96 ounce cans of concentrate while the smaller container 32 holds three 42 ounce cans. Except for their width, the two containers 32 and 34 are identical, and only container 34 is described below.

Figure 5:
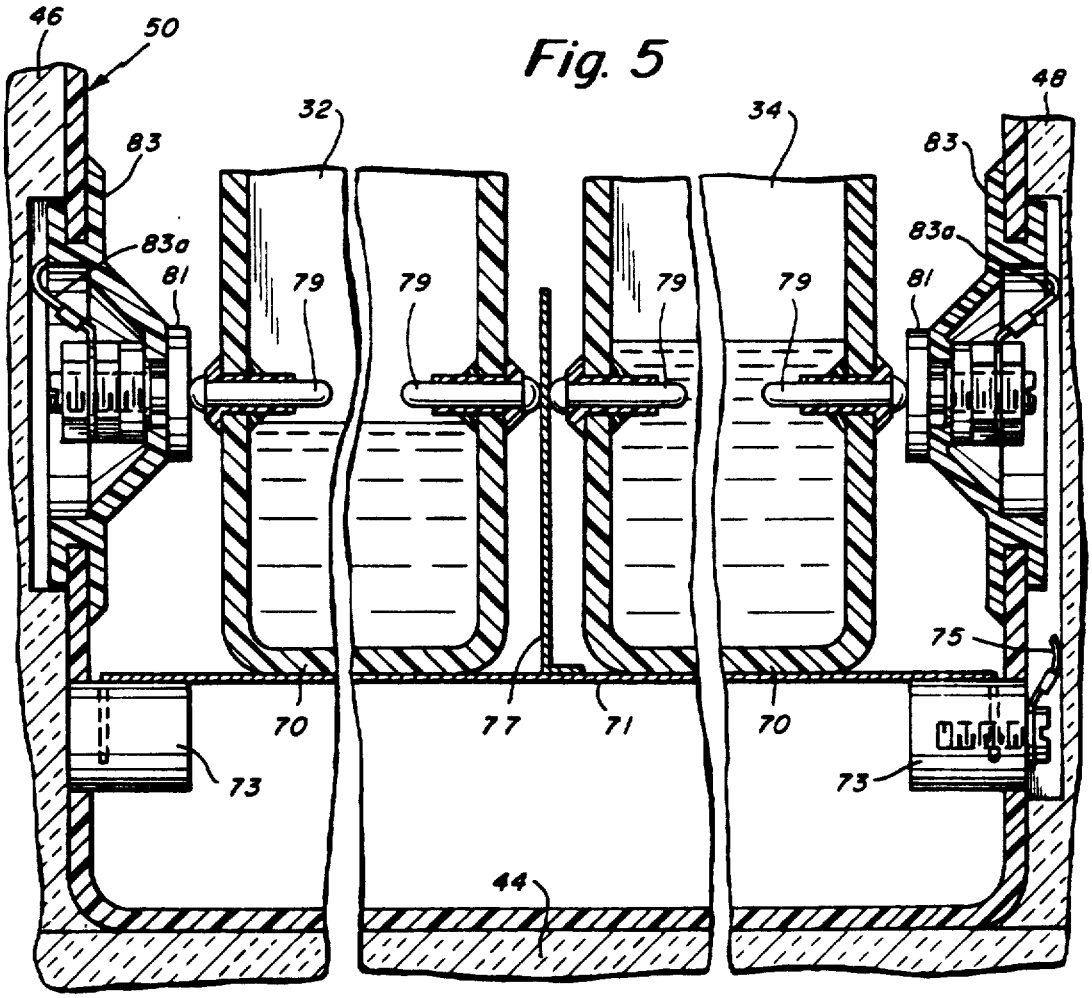
FIG. 5 is a fragmentary cross-sectional view taken along the section line 5—5 in FIG. 2.

Each container 32 and 34 has a bottom wall having a lower incline section 70 and an upper incline section 72 designed to fit above the wall sections 55 and 58 of the liner 50. A metal tray 71 is supported above the bottom wall section 55 of the liner 50 by the horizontal supports 73 as shown in FIGS. 3 and 5, and the lower walls 70 of the containers 32 and 34 in turn sit on the tray 71. The lower wall 70 of each container is fluted so as to provide a stable platform for the containers. The flutes diminish in height in a forward direction so as to form a horizontal surface which aligns with the tray 71.

In FIG. 5 a ground wire 75 is shown connected to one of the post supports 73, and the group wire through its post and tray 71 is connected in circuit with the ground plate 77 disposed between the two containers 32 and 34 in the cabinet liner 50. Each of the syrup concentrate containers 32 and 34 are provided with stainless steel electrodes 79 in their side walls adjacent the container bottom wall 70. The electrodes 79 form part of the out-of-syrup sensing circuit (not shown) which prevents an operator from discharging a particular beverage when the syrup for that beverage falls below a certain level. In FIG. 5 one probe 79 of each container is shown to engage the ground plate 77 when the containers are in place, and the other stainless steel electrodes of each container contact the terminals 81 in the cabinet liner side wall 83. The terminals 81 are shown in FIG. 5 connected to conductors 83a. When the syrup falls below the level of the stainless steel electrodes 79 as in container 32 in FIG. 5, an infinite resistance is imposed between the electrodes, which causes the control circuit (not shown) to disable the solenoid and pump in the water and concentrate systems described below for the beverage made of the concentrate in the container 32. As a result, the operator cannot call for the dispenser to deliver a drink made of that concentrate. On the other hand, when the quantity of syrup is sufficient to immerse the electrodes 79, the resistance between those electrodes is diminished so as to enable the control circuit (not shown) to open the valve. That condition is shown in container 34 in FIG. 5.

The front wall 74 of each container is stepped inwardly at the bottom to form a recess 76 is shown in FIGS. 1 and 3, which receives the upper portion of the valve assembly for dispensing the concentrate. As shown in the enlarged cross-sectional view of FIG. 6A., the recess 76 of each container has an opening 78 which supports a rubber connector 80 that telescopically receives an intake tube 82 at its inner end within the container. The intake tube 82 extends substantially to the bottom wall 70 of the container so that it can draw substantially all of the syrup from the container.

CONCENTRATE FILLER ASSEMBLY

Each container has a filler opening 86 in its top wall 88, defined by an upstanding cylindrical flange 90 designed to be capped by a cover-all lid when the container is stored with concentrate out of the cabinet. The opening 86 is sufficiently large so that a hand may be inserted for cleaning. The cylindrical flange 90 falls short of the upper wall 92 of the cabinet liner 50 and the opening 94 in that wall. In FIG. 3 a connector 96 is shown which registers with the opening 94 in the top liner wall 92 and receives the cylindrical flange 90 and seals against the bead 98.

Figure 4:
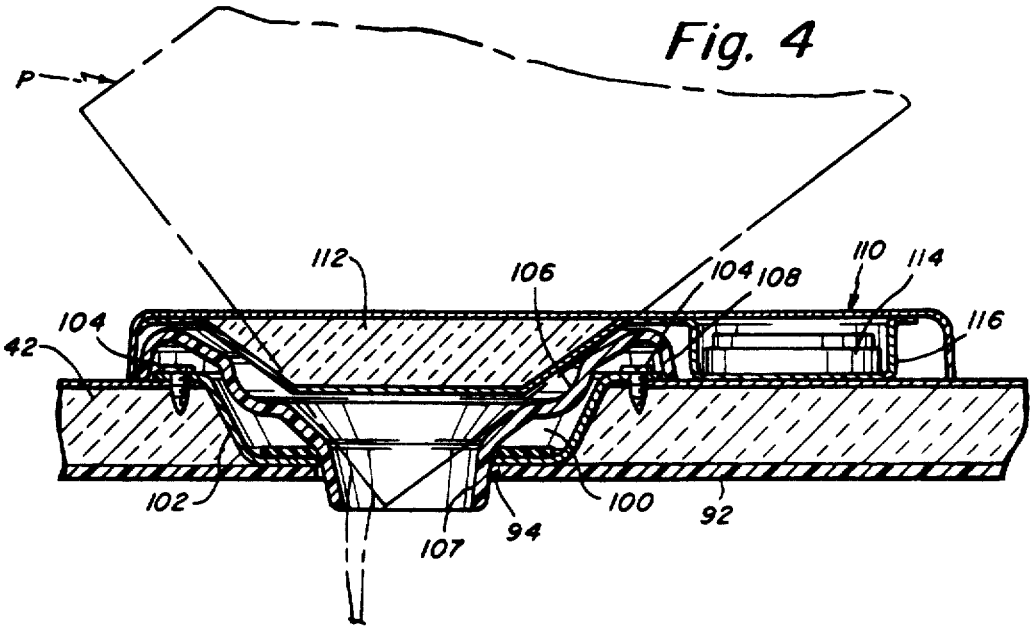
FIG. 4 is a fragmentary cross-sectional view on an enlarged scale of one of the filling assemblies for introducing the beverage concentrate to the dispenser, taken along section line 4—4 in FIG. 2.

In FIG. 4 the opening 94 in the top wall 92 of the liner 50 is shown to register with filler port 100 in the insulated top wall 42 of the cabinet. The port 100 is defined by a dish-shaped plastic sleeve 102 held in place by machine screws 104. Disposed in the port 100 in a fill funnel 106 having a spout 107 which extends through the opening 94 in the liner and into the cylindrical collar 90 in the container 34. The fill funnel 106 has a downwardly extending skirt 108 at the top which rests upon the upper surface of the insulating wall 42 as is clearly shown in FIGS. 3 and 4. In order to fill the container 34, a juice concentrate package P suggested in broken lines in FIG. 4 may be tipped to the position shown in that figure and its contents may be poured through the fill funnel 106 into it. The fill funnel is ordinarily closed by top cover 110 which sits on the upper surface of the insulating top wall 42 and which is insulated as shown at 112. A magnet 114 mounted in pocket 116 on the bottom of the cover retains the cover in place.

CABINET COOLING SYSTEM

Figure 7:
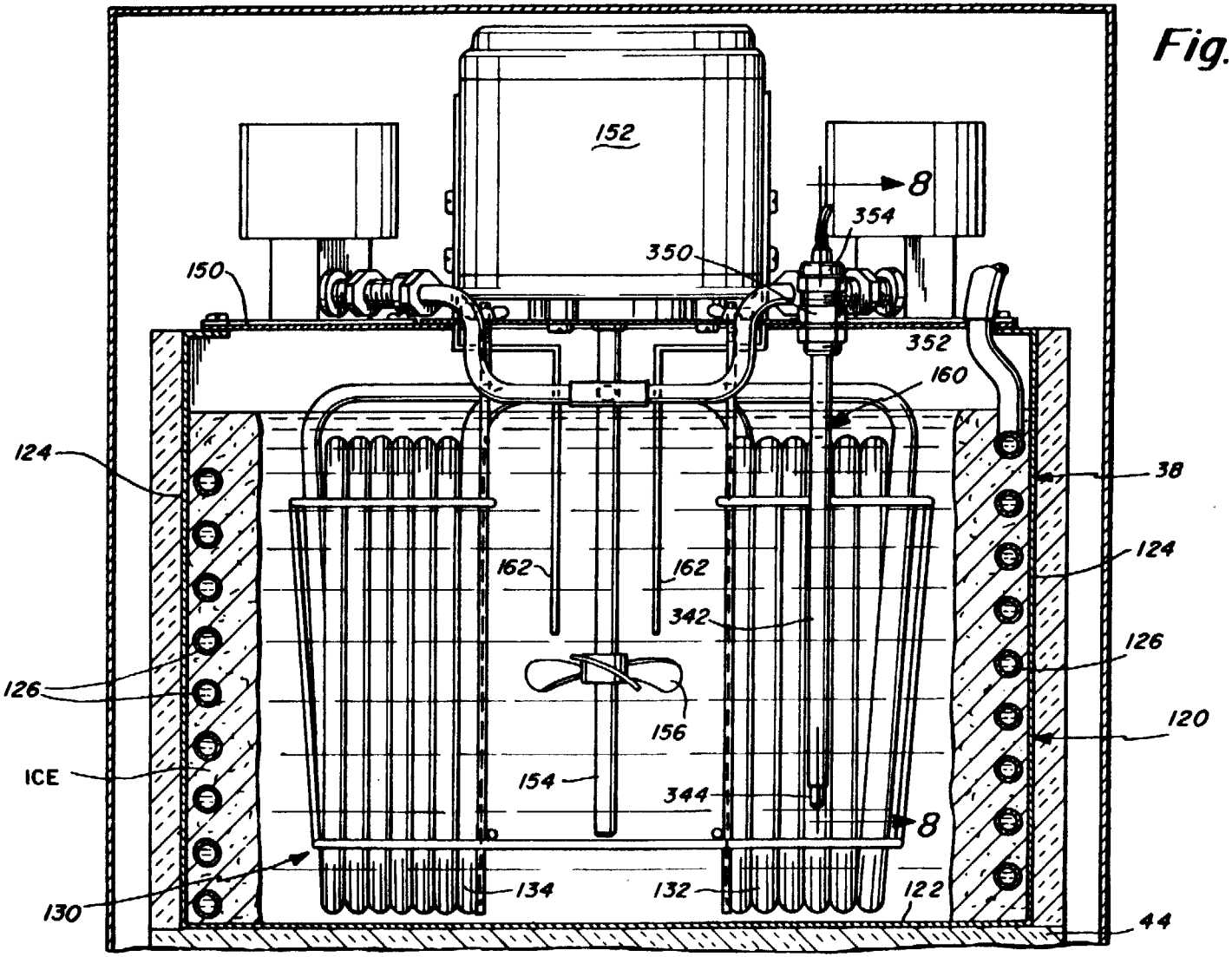
FIG. 7 is a fragmentary cross-sectional view of the ice bath in the upper portion of the dispenser, taken along section line 7—7 in FIG. 3.

As shown in FIGS. 2, 3 and 7, the ice bath 38 sits on the insulating bottom wall 44 behind the cabinet liner 50 containing the concentrate containers 32 and 34. The ice bath includes a large reservoir 120 having a bottom wall 122 and four vertical side walls 124. Refrigeration coil 126 lines the inside of the vertical side walls 124 in closely spaced turns. A second coil 130 for the potable water is disposed in the reservoir 120 inside the refrigerated coil 126.

Figure 11:
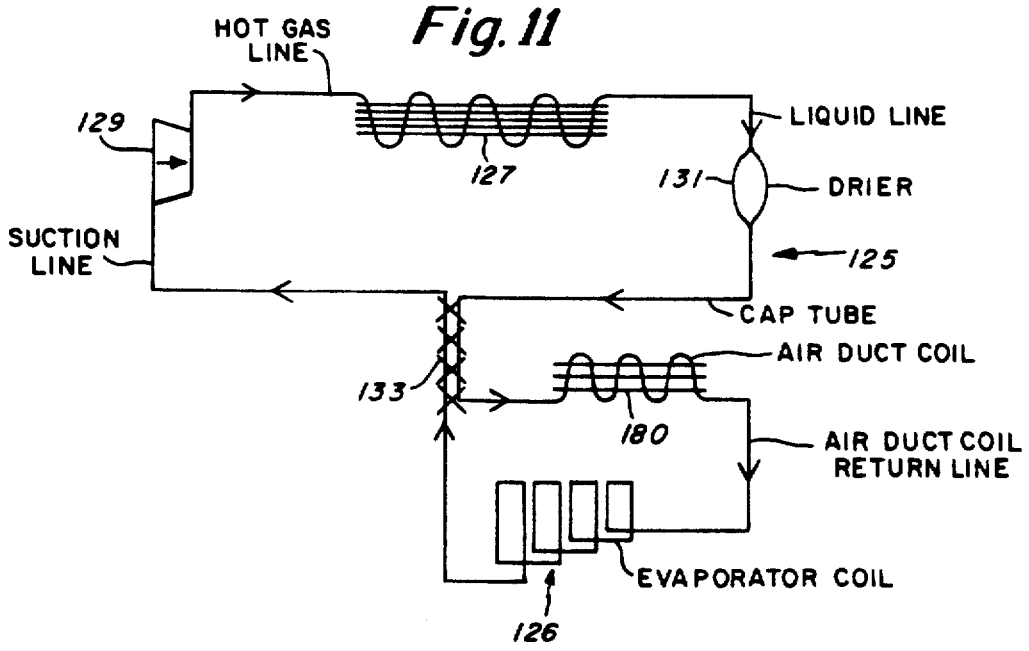
FIG. 11 is a diagrammatic drawing of the refrigeration system in the dispenser.

The refrigeration or evaporator coil 126 is shown in FIG. 11 to be part of the refrigeration system 125. That system also includes a condenser 127, compressor 129, drier 131 and heat exchanger 133 that are mounted in the base 24 of the machine. The coil 126 and an air duct coil 180 described in detail below are disposed in the cabinet 36 above the base 24.

Figure 10:
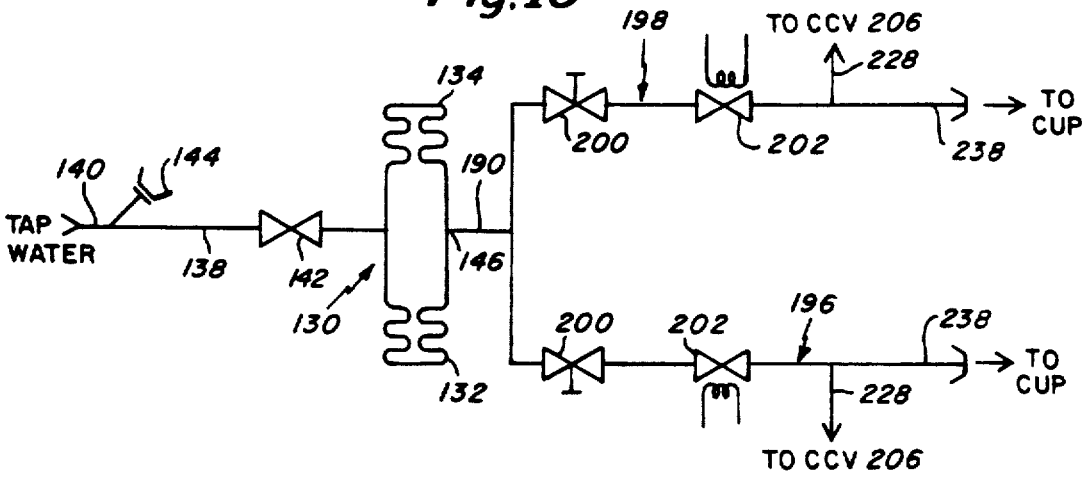
FIG. 10 is a diagrammatic drawing of the water system in the dispenser.

To maximize the effectiveness of the coding of the potable water, the coil 130 has parallel sections 132 and 134 as shown in FIGS. 2, 7 and 10. The two sections of the potable water coil are connected to a T fitting 136 which in turn is connected by duct 138 to a potable water inlet 140. As suggested in FIG. 10, the inlet duct 138 includes a vacuum breaker 142 and strainer 144. The two coil sections 132 and 134 are reunited at the T fitting 146.

The ice bath reservoir 120 is filled with water to a level above the top of the refrigeration coil 126 and the potable water coil 130, and the reservoir is covered by a plate 150 on top of which agitator motor 152 is mounted. The agitator motor has a shaft 154 that extends into the water bath and carries a bladed impeller 156 that circulates the water about the potable water coils 130. The plate 150 also carries a probe assembly 160 closely adjacent the rear wall 124 of the reservoir 120 for monitoring the build-up of ice in the bath. A pair of copper plates 162 connected to the motor and which extend into the water bath between the two sections 132 and 134 of the potable water coil act as heat sinks to cool the motor 152.

Figure 8:
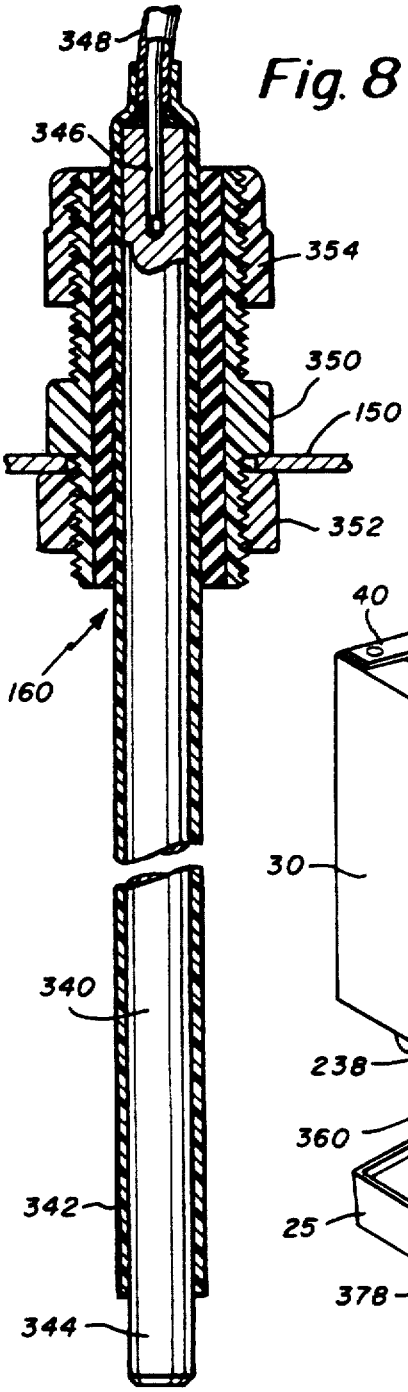
FIG. 8 is a fragmentary cross-sectional view of the probe in the ice bath, taken along the section line 8—8 in FIG. 7.

The probe assembly 160 is shown in detail in FIG. 8. It includes a stainless steel probe rod 340 carried in an insulating sheath 342 which shields all but the tip 344 of the probe. The stainless steel rod 340 is soldered at its upper end to the conductor 346 in turn contained in jacket 348 which is also soldered to the top of the sheath 342. The sheath 342 and wire jacket 348 prevent moisture from contacting the upper end of steel probe rod 340 which could short out the device.

The sheath 342 is carried by a neoprene bushing 350 which in turn is mounted on the top plate 150 of the ice bath. The bushing is held in place by a jamb nut 352 below the plate 150 and a lock nut 354. The probe assembly 160 senses whether sufficient ice has built up on the inside of the ice bath reservoir 120 to maintain the temperature of the potable water in the potable water coil 130 at the desired temperature. Under normal conditions, the probe tip 340 is embedded in the ice as shown in FIG. 3 which has a higher resistance than that of water, and the control circuit (not shown) which is connected to the probe shuts off the compressor in the refrigeration system in response to the high resistance imposed by the ice about the tip. However, when the ice in the bath melts so as to lower the resistance between the tip and the ground created by the metal reservoir 120, the circuit will reactivate the compressor and the refrigeration system to create more ice in the reservoir until such time as the probe tip is again embedded in ice. It is, of course, important that the compressor be turned off when the ice build-up on the inside of the reservoir is sufficient for cooling the potable water so as to prevent too much ice from forming in the bath which would in turn freeze the potable water in its coil 130. In use, perhaps eight or nine pounds of ice will build up in the bath about the refrigeration coils, which will chill the potable water as low as possible without freezing it.

Immediately in front of the reservoir 120 and behind the liner 50 is an air duct coil 180 which carries the refrigerant and is connected in series with the evaporator coil 126. The air duct coil 180 has an array of cooling fins 182 for achieving forced convection cooling of the cabinet. The fins are in the form of vertical aluminum plates that support the tubing of the coil 180, and the fins are disposed between the rear wall 183 of the liner 50 and the front side wall 124 of the reservoir.

In FIG. 3 arrows 184 suggest the path of cooling air for the beverage concentrate. The fan assembly 60 moves the air in the cabinet about a closed loop by pushing the air expelled by it upwardly between the fins 182 of the air duct coil 180, through the ports 186 at the upper end of the rear wall 183 of liner 50, across the top walls 88 of the containers 32 and 34 and between their adjacent side walls and about their remote side walls, down the front of the containers behind door 30 and beneath the containers and tray 71 and ports 189 to the fan assembly 60. The continuous circulation of air cooled by the coil 180 serves to maintain the temperature of the containers 32 and 34 and the concentrate in them at the desired level.

BEVERAGE DISCHARGE AND VALVE ASSEMBLY

Figure 12:
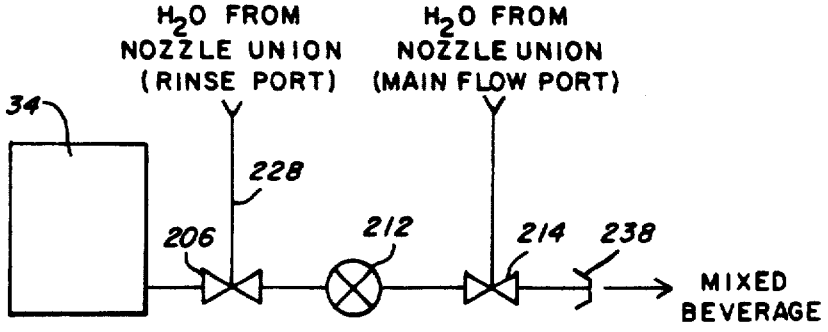
FIG. 12 is a diagrammatic drawing of the concentrate system.

The water and concentrate circuits shown diagrammatically in FIGS. 10 and 12 comprise the beverage discharge assembly. As mentioned above, the potable water system of FIG. 10 includes an inlet 140 to the duct 138 which is interrupted by a strainer 144 and vacuum breaker 142. The vacuum breaker 142 prevents back up from the dispenser into the potable water supply.

The potable water leaving the two coil section 132 and 134 of the potable water coil 130 in the ice bath are combined at the T fitting 146 and directed into the duct 190 which again divides so as to direct separate potable water supplies to both sections of the dispenser, that is, the separate beverage discharge assemblies for the separate juices whose concentrates are stored in the containers 32 and 34. It will be noted in FIG. 1 that the container 32 is connected to its discharge system 192 and a separate discharge system 194 is provided for the other container 34. Typically, the assembly 192 would discharge grape or grapefruit juice and assembly 194 would dispense orange juice. Each of these assemblies requires its own potable water supply, and this is provided by dividing the water from duct 190 into the two separate subsystems 196 and 198 for the assemblies 192 and 194, respectively (see FIG. 10). As the two assemblies are identical only one assembly 194 is described and that is sometimes referred to as the orange juice system.

The potable water from duct 190 is directed through a pressure regulator 200 and demand solenoid 202, and the water course again divides sending the potable water in one direction to the discharge nozzle 238 of the discharge assembly 194 and in another direction to the rinse circuit in the concentrate control valve 206 which is described separately below. The pressure regulators 200 for each of the two systems along with the vacuum breaker 142 may be located in the upper portion of the housing above the ice bath reservoir 120 for easy access.

In FIG. 12 the concentrate system is shown diagrammatically to include the concentrate container 34 which contains the concentrated orange juice, a concentrate control valve 206 connected to the potable water rinse line by duct 210, a concentrate pump 212, a mixing block 214 where the potable water and concentrate are combined to reconstitute the natural fruit juice, and the discharge nozzle 238. The mixing block 214 in FIG. 12 is shown to be connected to the main flow of water from the water system of FIG. 10. The details of the various parts in the water and concentrate systems are shown in detail in FIGS. 3 and 6A–6C.

In FIG. 3, the potable water system 198 is shown disposed beneath the cabinet 36 in the lower portion 26 of the housing. The syrup system is shown in that figure to extend from the container 34 downwardly from the cabinet 36 through the manifold 266 into the lower portion 26 of the housing where it joins the potable water system.

Figures 6A, 6B, 6C:
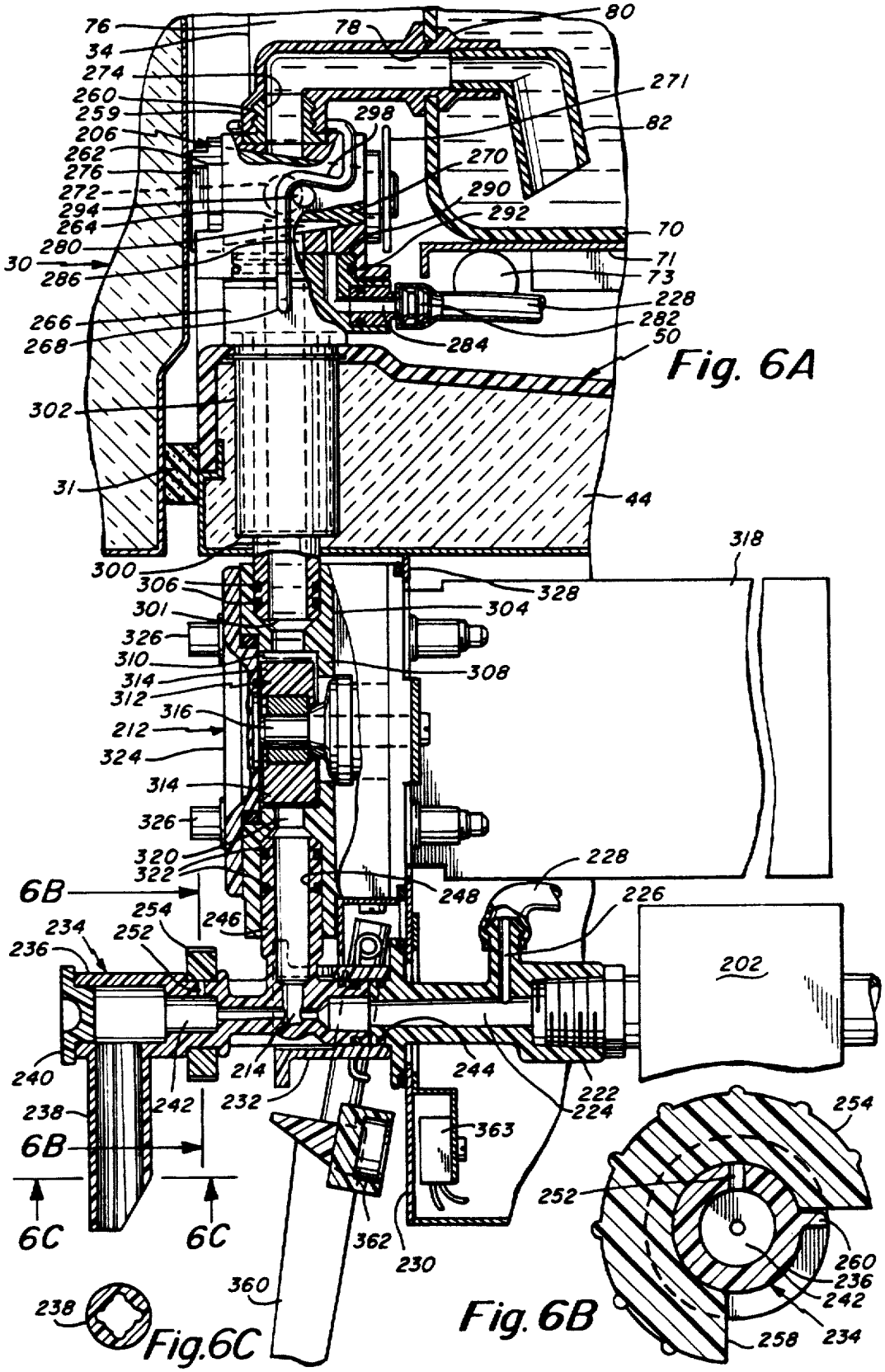
FIG. 6A is a cross-sectional view of the beverage discharge assembly, taken along the section line 6—6 in FIG. 1.
FIGS. 6B and 6C are cross-sectional views of parts of the discharge assembly, taken along the section lines 6B and 6C in FIG. 6A.

In FIGS. 3 and 6A the solenoid valve 202 in the discharge system for orange juice is shown connected to the nozzle union 222 which has an axial bore 224 and a radial tap 226, the latter being connected to the rinse water flush line 228. The nozzle union is mounted in the front wall 230 of the lower portion of the housing 20, and the part of the union which extends through the wall 230 is connected by means of sliding sleeve 232 to the nozzle body 234. The nozzle body 234 which sits outside the panel 230 has a horizontal section 236 and a vertical nozzle 238, and a cap 240 closes the end of the horizontal passage 242 through the body. To disconnect the nozzle body 234 from the unit, the slide sleeve 232 is moved to the left as shown in FIG. 6A so that it releases the end of the nozzle union 222 and clears the O-ring 244.

A radical, vertical syrup inlet 246 has a passage 248 which communicates with the axial passage 242 through the nozzle body at the mixing block chamber 214. The syrup and potable water mix in the chamber 214 and flow together through the axial passage 242 to the nozzle 238.

An aeration vent 252 is formed in the nozzle body downstream of the syrup inlet 246, and the vent is controlled by a knurled ring 254 mounted for rotation on the body 234. In FIG. 6B the ring 254 is shown in a position which closes the vent 252, and it may be turned approximately 90° counterclockwise so that its shoulder 258 engages the stop 260 in which position the vent 252 is exposed. Thus, the ring 254 serves as an on-off valve for controlling the aeration of the beverage. When the vent 252 is open, the beverage dispensed through the valve body 234 will develop a slight foam (head), and when the vent 252 is closed, no foam will be formed.

As is shown in FIG. 6C, the nozzle 238 is fluted in its interior surface. The fluting which is axially directed serves to straighten the flow of the beverage through the nozzle and to form a better stream of liquid for dispensing.

The syrup system is connected to the potable water system through the syrup inlet 246. The major elements of the syrup system which were identified in connection with FIG. 12 are the concentrate control valve 206 and the concentrate pump 212.

In FIG. 6A the intake 82 which is disposed inside the syrup container 34 is shown to telescopically fit within the inner end of the rubber connector 80 which extends through the container wall. Connector 80 has a right angle bend with its downwardly extending section 259 connected to the neck 260 of the body 262 of the concentrate control valve 206. The body 262 of the concentrate control valve is mounted in the dispenser by a bail wire 264 pivoted to the manifold 266 at 268. It will be noted in FIG. 3 that the manifold 266 is mounted in the insulating wall 44 of the cabinet. The concentrate control valve 206 has a tapered barrel 270 through which extends a radial passage 272 which may be brought into registration with the inlet 274 of the concentrate control valve in the neck 260. In FIG. 6A the passage 272 in the barrel 270 is shown disposed perpendicular to the inlet 274 and therefore the valve prevents the flow of syrup to the pump 212. The position of the barrel is controlled by the finger grip 276, that is, the finger grip allows the operator to manipulate the barrel so as to turn it from the position shown in FIG. 6A to a position at right angles thereto wherein the passage 272 communicates with the inlet 274. This latter position is the normal running position for the machine.

The barrel 270 also has an axially extending groove 280 in its outer surface, which allows rinse water (potable water) to be directed through the manifold 266 and pump 212 when the system is to be cleaned. The flush tube 228 is connected to the manifold by means of the fitting 282 disposed in the cabinet in the air passage beneath the tray 71. As is apparent in FIG. 6A, when the barrel 270 of the concentrate control valve is in the position shown, rinse water can flow from the flush tube 228 into the manifold passage 284, through the groove 280, and out the outlet 286 of the concentrate control valve body 262 and through the manifold passage 266.

It will be noted that the upper end of the manifold 266 fits within a recess 290 in the concentrate control valve body 262, and an O-ring seal 292 prevents leakage of concentrate or rinse water between the surfaces of the recess 290 and the outer surface of the upper portion of the manifold. The manifold and concentrate control valve as described above are held together by the bail wire 264 which clips over the ears 294 on the concentrate valve body 262. To break the connection between the manifold and the concentrate control valve body 262, the bail wire 264 must be pivoted counterclockwise as viewed in FIG. 6A so that the hook portion 298 releases the ears 294.

The lower portion 300 of the manifold 266 extends downwardly through a liner bushing 302 which is mounted in the insulating bottom wall 44 of the cabinet of the dispenser. The end 301 of the manifold is connected to the inlet port 304 of the concentrate pump 212. As shown in FIG. 6A, the end 301 of the manifold is sealed in the inlet port 304 by a series of O-rings 306.

The pump head 308 has an eccentric pump chamber 310 connected at its top to the pump inlet 304. An impeller 312 having an array of flexible vanes 314 is mounted for rotation in the pump chamber 310 and is driven by the shaft 316 of motor 318. The chamber is eccentrically located with respect to the pump vanes to create a low pressure area at the inlet 304 to enable the concentrate to pass into the chamber. The concentrate is discharged from the pump head through the port 320, 180° displaced from the inlet 304. The outlet port 320 receives the radial inlet duct 246 which forms a part of the nozzle body 234 as shown in FIG. 6A. It will be noted in FIG. 6A that a pair of O-rings 322 are carried on the outer surface of the inlet duct 246 and form a seal with the inner surface of outlet 320. The pump head 308 carries a cover 324 which closes the chamber 310. The cover 324 is held in place by mounting screws 326 which also secure the head to the mounting plate 328 in the lower portion of the dispenser.

In FIG. 1 a pair of push handles 360 are shown connected to the dispensing systems for the separate beverages. The left handle 360 shown in that figure obviously controls the discharge of beverage reconstituted from the syrup in container 32 while the right push handle controls the dispensing of beverage reconstituted with the syrup in container 34. The push handles 360 each carry a magnet 362 which in turn operate switches 363 in the lower portion of the housing (see FIG. 6A). Those switches are in the control circuit (not shown) and when closed complete the circuits for the concentrate pump 212 and solenoid valve 202 in the syrup and potable water lines of the respective systems. To draw beverage from the dispenser, the operator need only push the selected push handle toward the housing so as to actuate a particular switch 363.

Figure 9:
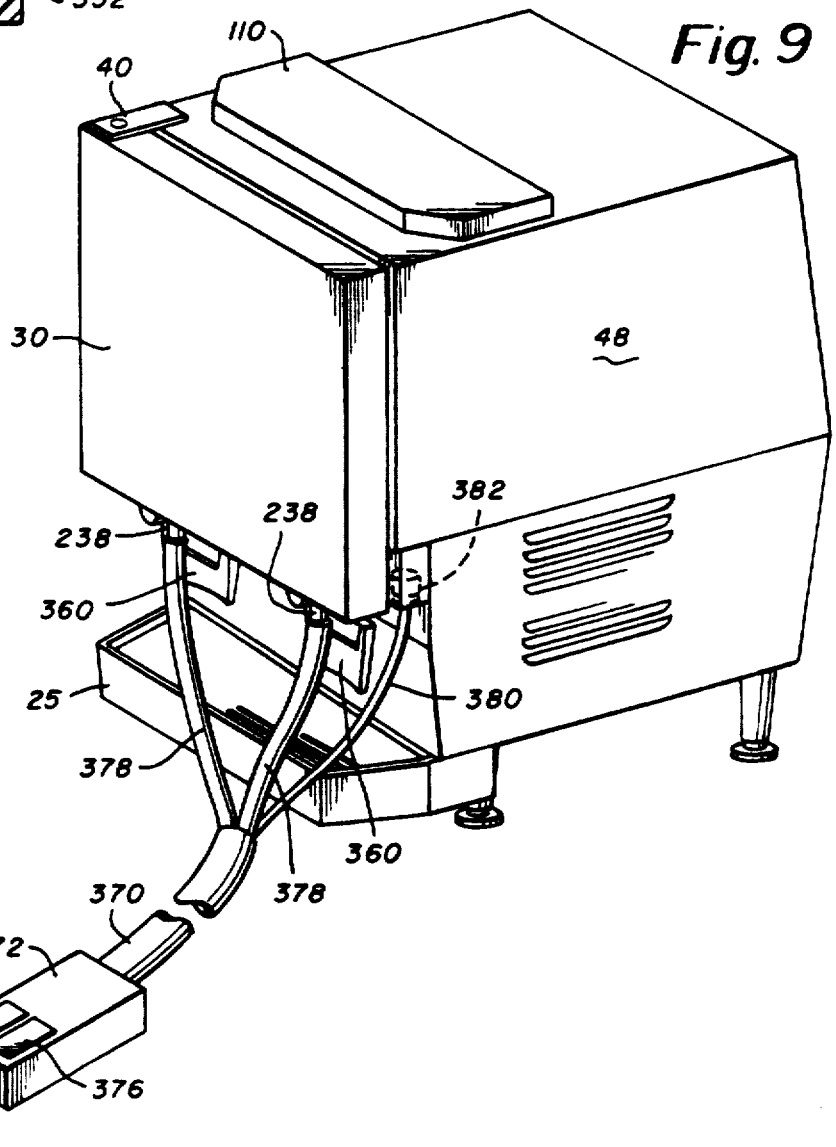
FIG. 9 is a perspective view of the beverage dispenser of this invention and showing the manner in which a hook-up for remote dispensing may be connected to it.

In FIG. 9, a remote hook-up is shown which enables an operator to discharge either of the beverages at a remote location. For that purpose, a flexible sheath 370 is shown connected to block 372 having a pair of control switches 374 and 376. The sheath 370 carries flexible ducts 378 which are adapted to telescope over the nozzles 238. An electrical cable 380 is also carried by the sheath and plugs into the connector 382 on the front of the cabinet. The electrical cable 380 allows the switches 374 and 376 to control the respective solenoid valves 202 and pumps 212 for the potable water and concentrate so as to dispense the appropriate beverage.

From the foregoing description, it is evident that the dispenser of this invention is capable of conveniently dispensing two separate reconstituted beverages. It provides a most convenient means of storing under refrigerated conditions the concentrate from which the reconstituted beverage is made. The machine maximizes the freshness and taste of the beverage by mixing the concentrate and refrigerated water only when there is a call for the beverage. Furthermore, the same refrigeration system serves as the cooling source both for the stored concentrate and the potable water.

The dispenser of this invention is very convenient to clean, for it allows the storage containers 32 and 34 with their respective concentrate control valves 206 to be readily removed from the cabinet 36 and provides means for purging the concentrate line between the control valve 206 and the nozzle body. To remove either of the concentrate containers 32 and 34 with its respective control valve 206, the control valve is turned to the rinse position (the position shown for the barrel 270 in FIG. 6A) and the appropriate push handle 360 or 362 is pushed so as to open the solenoid valve 202 to allow potable water to flush the system. When the flush water runs clear, the push handle is released, the cover 110 of the filter assembly along with the fill funnel 106 is removed, the bale wire 264 is pulled forward to release the pins 294, and the valve body 262 is pulled off the top of the manifold 266 which then permits the concentrate container to slide out of the cabinet.

The openings 90 in the containers 32 and 34 are large enough to permit the hand to be inserted inside so that the interior of the container may be thoroughly washed. The rubber connector 80 can very easily be disconnected from the neck 260 of the valve body 262, and the intake duct 82 can be removed from the inner end of the connector 80 to permit those parts to be separately washed.

To clean the concentrate control valve 206, the control valve barrel 270 is removed from the valve body 262 by sliding the clip 271 off the smaller diameter end of the tapered barrel 270 and drawing the barrel out the front of the body. The pump 212 may also be conveniently cleaned by disconnecting it from the lower end 301 of the manifold and removing the pump cover 324 by loosening the screws 326. The loosening of the screws 326 also allows the entire pump assembly to be removed from the dispenser. The nozzle body 234 may also be conveniently removed for cleaning merely by sliding the sleeve 232 off the forward end of nozzle union 222.

Having described this invention in detail those skilled in the art will appreciate that numerous modifications may be made of this dispenser without departing from the spirit of this invention. Therefore, it is not intended that the breadth of this invention be limited to the specific embodiment illustrated and described. Rather, it is intended that the scope of this invention be determined by the appended claims and their equivalents.

What is claimed is:

1. A dual beverage dispenser comprising:

a base and a cabinet mounted on the base, said cabinet being open toward the front, two containers in the cabinet for storing beverage concentrate to be mixed with water to make the two drinks to be dispensed by the dispenser, a hinged door for opening and closing the front of the cabinet, an ice bath at the rear of the cabinet, a stirrer having a propeller in the bath and a motor disposed above the bath;

a refrigeration system including a compressor and condensor in the base and an evaporator in the bath for reducing the temperature of water in the bath, a pair of dispensing nozzles secured to the base and means connecting the respective nozzles to the different concentrate containers in the cabinet, a potable water circuit including an inlet for connecting a water source to the dispenser and a cooling coil in the bath for cooling the potable water, said circuit also including ducts connecting the coil to the inlet and to the dispensing nozzles, an air cooling coil forming part of the refrigeration system in series with the evaporator in the bath and disposed outside the bath in the cabinet, means including a fan in the cabinet for circulating air in the cabinet over the air cooling coil and about the concentrate containers in the cabinet to maintain the temperature of the concentrates in the cabinet at a selected level, and a mixing block in each nozzle for combining concentrate and potable water before they are discharged from the nozzles.

2. A dispenser as defined in claim 1 further characterized by said cabinet having a top wall and a pair of openings in the top wall for separately filling the containers in the cabinet.

3. A dispenser as defined in claim 1 further characterized by heat exchange plates connected to the motor and extending into the bath for cooling the motor.

4. A beverage dispenser comprising a base and insulating walls defining a cabinet on the base, a liner in the cabinet defining a compartment, a concentrate container in the compartment for storing beverage concentrate to be mixed with water to make the drink to be dispensed by the dispenser, a dispensing nozzle secured to the base and means connecting the dispensing nozzle to the concentrate container, a refrigeration system including a water circuit having means for connecting a water source to the dispensing nozzle and means for cooling the water, said refrigeration system including an air cooling coil immediately adjacent the liner and within the cabinet, said liner having a bottom wall with an elevated rear portion adjacent the air cooling coil, and means including a fan disposed below the elevated portion of the bottom wall of the liner for circulating air in the cabinet through the liner and about any containers within the liner.

5. A dispenser as defined in claim 4 further characterized by a pair of concentrate containers in the liner, and spaces between the containers and between the containers and the liner walls for circulating the cool air about the container.

6. A dispenser as defined to claim 4 further characterized by a tray mounted in the liner for supporting the container above the liner bottom wall.

7. A dispenser as defined in claim 4 further characterized by said means for cooling the water including a water bath in the cabinet behind the air cooling coil, an evaporator in the refrigeration system and mounted in the bath, and a temperature probe in the bath responsive to ice build up in the bath.

8. A dispenser as defined in claim 7 further characterized by a motor in the housing and disposed above the bath, and an impeller driven by the motor and disposed in the bath for circulating water in said bath.

9. A dispenser as defined in claim 4 further characterized by means including electrodes in the wall of the container for sensing when the concentrate in the container falls below a prescribed level.

10. A dispenser as defined in claim 4 further characterized by a door on the front of the cabinet providing access to the interior of the liner for introducing and removing the container to and from the liner, and openings in the top of the cabinet, and container for replenishing concentrate in the container without removing the container from the cabinet.

11. A dispenser as defined in claim 10 further characterized by a cover on the top of the cabinet for closing the top opening therein, and a removable funnel in the opening and registering with the opening in the top of the container.

12. A beverage dispenser comprising a housing including a base and an insulated cabinet on the base, an ice bath at the rear of the cabinet, two concentrate containers of different size mounted in the front of the cabinet, separate beverage discharge assemblies including mixing blocks mounted on the housing and a dispensing nozzle for each container, a potable water system connected to the mixing blocks and having a water coil in the ice bath, a refrigeration system in the housing having an evaporator coil in the bath and an air cooling coil adjacent the concentrate containers, said evaporator coil cooling water in the bath so as to cool potable water in the water coil, a fan in the cabinet for circulating air in the cabinet over the air cooling coil and about the containers, and means including a concentrate control valve and pump in each of the beverage discharge assemblies for connecting the containers to their respective mixing blocks.

13. A beverage dispenser comprising a housing including a base and an insulated cabinet on the base, an ice bath at the rear of the cabinet and at least one concentrate container in the front of the cabinet, a beverage discharge assembly including a mixing block mounted on the housing and having a dispensing nozzle, a potable water system connected to the mixing block and having a water coil in the ice bath, a refrigeration system in the housing having a evaporator coil in the bath and an air cooling coil adjacent the concentrate container, said evaporator coil cooling water in the bath so as to cool potable water in the water coil, a fan in the cabinet for circulating air in the cabinet over the air cooling coil and about the container, a door in the front of the cabinet for removing the container, an opening in the top of the cabinet and the container for filling the container without moving it from the cabinet, means including a concentrate control valve in the cabinet for connecting the container to the mixing block, and means for releasably retaining the valve in the cabinet so that it may be removed with the container.

14. A beverage dispenser comprising a housing including a base and an insulated cabinet on the base, an ice bath at the rear of the cabinet and at least one concentrate container in the front of the cabinet, a beverage discharge assembly including a mixing block mounted on the housing and having a dispensing nozzle, a potable water system connected to the mixing block and having a water coil in the ice bath, a refrigeration system in the housing having an evaporator coil in the bath and an air cooling adjacent the concentrate container, said evaporator coil cooling water in the bath so as to cool potable water in the water coil, a fan in the cabinet for circulating air in the cabinet over the air cooling coil and about the container, means including a concentrate control valve in the cabinet for connecting the container to the mixing block, and a flush line connecting the potable water system to the concentrate control valve for cleaning the connection between the concentrate container and the nozzle.

15. A dispenser as defined in claim 14 further characterized by said potable water system including a solenoid valve in the housing for controlling the flow of water through the system, and means including a push handle on the housing for opening the solenoid valve.

16. A beverage dispenser comprising a base and insulating walls defining a cabinet on the base, a liner in the cabinet defining a compartment, a refrigeration system including an air cooling coil immediately adjacent the liner and within the cabinet, said liner having a bottom wall with an elevated rear portion adjacent the air cooling coil, and means including a fan disposed below the elevated portion of the bottom wall of the liner for circulating air in the cabinet through the liner and about any containers within the liner, a water bath in the cabinet behind the air cooling coil, an evaporator in the refrigeration system and mounted in the bath, a temperature probe in the bath responsive to ice build up in the bath, a motor in the cabinet and disposed above the bath, an impeller driven by the motor and disposed in the bath for circulating water in said bath, and heat exchange plates connected to the motor and extending into the bath for cooling the motor.

17. A beverage dispenser comprising a base and an insulated cabinet mounted on the base, said cabinet being open toward the front, a container in the cabinet for storing beverage concentrate to be mixed with water to make a drink to be dispensed by the dispenser, a door in the front of the cabinet for removing the container, an ice bath at the rear of the cabinet, a refrigeration system including a compressor and a condenser in the base and an evaporator in the bath for reducing the temperature of water in the bath, a dispensing nozzle secured to the base and means connecting the dispensing nozzle to the concentrate container in the cabinet, a water circuit including an inlet for connecting a water source to the dispenser and a water cooling coil in the bath for cooling the water, said circuit also including ducts connecting the water cooling coil to the inlet and to the dispensing nozzle, an air cooling coil forming part of the refrigeration system in series with the evaporator in the bath and disposed outside the bath in the cabinet, means including a fan in the cabinet for circulating air in the cabinet over the air cooling coil and about the concentrate container in the cabinet to maintain the temperature of the concentrate in the cabinet at a selected level, and a mixing block in the nozzle for combining concentrate and water before they are discharged from the nozzle.

18. A dispenser as defined in claim 17 further characterized by an opening in the top of the cabinet and the container for filling the container without removing it from the cabinet.

*19. A beverage dispenser comprising:*

*a housing including a base and a cabinet on the base, at least one concentrate container disposed in the cabinet,*

*door means on the cabinet for providing access to the container for insertion and removal of the container.*

*a discharge assembly including means defining a mixing chamber and a dispensing nozzle,*

*a potable water source for providing potable water,*

*means for coupling the potable water to said mixing chamber,*

*means for directing concentrate from the concentrate container to said mixing chamber and including a valve having a first position in which concentrate flows therethrough and a second position in which the concentrate flow is inhibited while permitting potable water flow therethrough for cleaning at least a portion of said means for directing concentrate, and at least a portion of said discharge assembly, between said valve and said dispensing nozzle.*

*20. A dispenser as defined in claim 19 wherein said means for directing concentrate includes a concentrate pump disposed downstream of said valve and adapted to be operated to pump concentrate to the nozzle in the first position of the valve, and to pump potable water to the nozzle in the second position of the valve.*

*21. A dispenser as defined in claim 20 wherein said valve includes manual selection means for selecting one of said first and second positions.*

*22. A dispenser as defined in claim 21 including a support manifold disposed between said valve and said concentrate pump.*

*23. A dispenser as defined in claim 22 including a flush line coupling from a water control solenoid to the valve to introduce potable water to the valve.*

*24. A dispenser as defined in claim 23 wherein said valve is removable from the support manifold.*

*25. A dispenser as defined in claim 24 including means supported from the manifold for retaining the valve in position on the manifold.*

*26. A dispenser as defined in claim 19 wherein said source of cool potable water includes an ice bath at the rear of the cabinet having a water coil disposed in the ice bath.*

*27. A dispenser as defined in claim 26 including a refrigeration system in the housing having an evaporator coil in the bath.*

*28. A dispenser as defined in claim 27 including an air cooling coil adjacent the concentrate container, and a fan in the cabinet for circulating air in the cabinet over the air cooling coil and about the container.*

*29. A dispenser as defined in claim 19 including at least a pair of side-by-side disposed concentrate containers.*

*30. A dispenser as defined in claim 29 wherein one container is larger than the other.*

*31. A dispenser as defined in claim 19 including an ice bath at the rear of the cabinet having a water coil disposed in the ice bath, and a stirrer having a propeller in the bath and a motor disposed above the bath.*

*32. A dispenser as defined in claim 31 including a temperature probe in the ice bath responsive to ice build up in the bath to control the level of ice build up.*

*33. A dispenser as defined in claim 19 wherein said cabinet comprises an insulated cabinet.*

*34. A dispenser as defined in claim 19 wherein said valve is a single valve.*

*35. A dispenser as defined in claim 19 including a support manifold disposed downstream of said valve and between said valve and said discharge assembly.*

*36. A dispenser as defined in claim 35 wherein said valve is removable from the support manifold.*

*37. A dispenser as defined in claim 36 including means supported from said manifold for releasably retaining said valve in position on said manifold.*

*38. A dispenser as defined in claim 19 including means for releasably retaining said valve within said cabinet.*

*39. A beverage dispenser comprising;*

*a housing including a base and a cabinet on the base,*

*at least one concentrate container,*

*means in the cabinet and upon which the container is supported,*

*outlet means connected to said concentrate container and through which the concentrate can be drawn,*

*door means on the cabinet for providing access to the container for insertion and removal of the container,*

*a discharge assembly including means defining a mixing chamber and a dispensing nozzle,*

*a potable water source for providing potable water,*

*means for coupling the potable water to said mixing chamber,*

*means for coupling the outlet means of the concentrate container to the mixing chamber to enable mixing of concentrate and water,*

*said latter means for coupling including quick-disconnect means for enabling ready removal of the concentrate container from the cabinet, said quick-disconnect means comprising engaging means for slidably but releasably engaging the outlet means, and holding means intercoupling said engaging means and said outlet means for releasably holding said engaging means and said outlet means in releasably fixed relative liquid-tight position.*

*40. A beverage as defined in claim 39 wherein said means in the cabinet upon which the container is supported comprises a tray.*

*41. A beverage dispenser as defined in claim 39 wherein said cabinet comprises an insulated cabinet.*

*42. A beverage dispenser as defined in claim 39 wherein; said engaging means is connected to the cabinet. and*

*said holding means comprises a member pivotably connected to said engaging means and releasably engaging a plurality of projections on said outlet means.*

*43. A beverage dispenser as defined in claim 42 wherein; said engaging means comprises a support manifold, and said member comprises a bail wire.*

*44. A beverage dispenser as defined in claim 39 wherein said latter means includes a valve connected to said outlet means for selectively restricting flow from said outlet means, said door means being disposed on the front of said cabinet.*

*45. A beverage dispenser comprising:*

*a housing including a base and a cabinet on the base,*

*at least one concentrate container,*

*means in the cabinet and upon which the container is supported,*

*said concentrate container having outlet means therefrom through which the concentrate can be drawn,*

*door means on the cabinet for providing access to the container for insertion and removal of the container,*

*a discharge assembly including means defining a mixing chamber and a dispensing nozzle,*

*a potable water source for providing potable water,*

*means for coupling the potable water to said mixing chamber,*

*means for coupling the outlet means for the concentrate container to the mixing chamber to enable mixing of concentrate and water,*

*said latter means for coupling including quick-disconnect means for enabling ready removal of the concentrate container from the cabinet,*

*wherein said latter means includes a concentrate pump for drawing the concentrate from the outlet means, said door means being disposed on the front of the cabinet.*

*46. A beverage dispenser as defined in claim 45 further including a valve coupled between said outlet means and said concentrate pump.*

*47. A beverage dispenser as defined in claim 46 wherein said valve is a single control valve.*

*48. A beverage dispenser as defined in claim 46 wherein said valve has a first position in which concentrate flows therethrough and a second position in which the concentrate flow is inhibited while permitting potable water flow therethrough for cleaning at least the connection between the valve and the nozzle.*

*49. A beverage dispenser as defined in claim 48 wherein said valve includes manual selection means for selecting one of said first and second positions.*

*50. A beverage dispenser as defined in claim 49 including a support manifold disposed between said valve and said concentrate pump.*

*51. A beverage dispenser as defined in claim 50 including a flush line coupling from a water control solenoid to the valve to introduce potable water to the valve.*

*52. A beverage dispenser as defined in claim 51 wherein said valve is removable from the support manifold.*

*53. A beverage dispenser as defined in claim 52 including bail means supported from the manifold for retaining the valve in position on the manifold.*

*54. A beverage dispenser as defined in claim 53 wherein said source of cool potable water includes an ice bath at the rear of the cabinet having a water coil disposed in the ice bath, including a refrigeration system in the housing having an evaporator coil in the bath, including an air cooling coil adjacent the concentrate container, and a fan in the cabinet for circulating air in the cabinet over the air cooling coil and about the container.*

*55. A beverage dispenser comprising;*

*a housing including a base and a cabinet on the base,*

*at least one concentrate container,*

*means in the cabinet and upon which the container is supported,*

*said concentrate container having outlet means therefrom through which the concentrate can be drawn,*

*door means on the cabinet for providing access to the container for insertion and removal of the container,*

*a discharge assembly including means defining a mixing chamber and a dispensing nozzle,*

*a potable water source for providing potable water,*

*means for coupling the potable water to said mixing chamber,*

*means for coupling the outlet means of the concentrate container to the mixing chamber to enable mixing of concentrate and water,*

*said latter means for coupling including quick-disconnect means for enabling ready removal of the concentrate container from the cabinet,*

*wherein said quick-disconnect means comprises a concentrate control valve supported over a support manifold and wherein the valve is readily disengaged from the manifold to enable removal of the container from the cabinet.*

*56. A beverage dispenser comprising;* a housing including a base and a cabinet on the base,

*at least one concentrate container, wherein said container has a top fill opening and wherein said cabinet also has a top fill opening aligning with the fill opening on the container so as to enable refilling of the container through the top of the dispenser,*

*means in the cabinet and upon which the container is supported,*

*said concentrate container having outlet means therefrom through which the concentrate can be drawn,*

*door means on the cabinet for providing access to the container for insertion and removal of the container,*

*a discharge assembly including means defining a mixing chamber and a dispensing nozzle,*

*a potable water source for providing potable water,*

*means for coupling the potable water to said mixing chamber,*

*means for coupling the outlet means of the concentrate container to the mixing chamber to enable mixing of concentrate and water,*

*said latter means for coupling including quick-disconnect means for enabling ready removal of the concentrate container from the cabinet.*

*57. A beverage dispenser as defined in claim 56 wherein said door means is on the front of the cabinet and can be opened during top filling so that the level of liquid in the container can be viewed.*

* * * * *